(12) United States Patent
Nowatzyk (10) Patent No.: US 9,581,814 B2
(45) Date of Patent: Feb. 28, 2017

(54) TRANSPARENT DISPLAY FOR MOBILE DEVICE

(75) Inventor: Andreas G. Nowatzyk, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 753 days.

(21) Appl. No.: 13/354,353

(22) Filed: Jan. 20, 2012

(65) Prior Publication Data
US 2013/0187950 A1 Jul. 25, 2013

(51) Int. Cl.
*H04N 5/00* (2011.01)
*G02B 27/01* (2006.01)
*G09G 3/00* (2006.01)
*G02B 27/42* (2006.01)
*H04N 5/89* (2006.01)
*H04M 1/02* (2006.01)

(52) U.S. Cl.
CPC ....... *G02B 27/0103* (2013.01); *G02B 27/4205* (2013.01); *G09G 3/003* (2013.01); *G02B 2027/0107* (2013.01); *G03H 2227/02* (2013.01); *G03H 2227/06* (2013.01); *G09G 2380/10* (2013.01); *H04M 1/0272* (2013.01); *H04N 5/89* (2013.01)

(58) Field of Classification Search
CPC  G03H 1/00; G03H 2001/0088; G03H 1/0005; G03H 1/2294; G03H 1/08
USPC ......................................................... 348/40
See application file for complete search history.

(56) References Cited

U.S. PATENT DOCUMENTS 3,940,204 A    2/1976  Withrington
4,725,142 A *  2/1988  Sharnoff ................ G01B 9/025
                                                    356/458
(Continued)

FOREIGN PATENT DOCUMENTS

CN     101095343 A     12/2007
CN     100492924 C      5/2009
(Continued)

OTHER PUBLICATIONS

Zhou, et al., "Trends in Augmented Reality Tracking, Interaction and Display: A Review of Ten Years of ISMAR", Retrieved at <<http://cin.ufpe.br/~in1123/material/2008-Trend-inAugmentedRealityTrackingInteractionandDisplayAReviewofTenYearsofISMAR.pdf>>, 7th International Symposium on Mixed and Augmented Reality, Sep. 18, 2008, pp. 193-202.
(Continued)

*Primary Examiner* — Frank Huang
(74) *Attorney, Agent, or Firm* — Brandon K. Roper; Judy Yee; Micky Minhas (57) ABSTRACT

A projection-type display device is connectively coupled to a mobile device (such as a smartphone) where the light generated by a small projection device is directed at a relatively transparent holographic optical element (HOE) to provide a display to an operator of the mobile device or a viewer. The projector and HOE may be configured to produce and magnify a virtual image that is perceived as being displayed at a large distance from the operator who views the image through the HOE. The HOE may comprise a volume grating effective at only the narrow wavelengths of the projection device to maximize transparency while also maximizing the light reflected from the display projector to the eyes of the operator.

19 Claims, 5 Drawing Sheets

(56) References Cited

U.S. PATENT DOCUMENTS

| | | |
|---|---|---|
| 6,292,305 B1 | 9/2001 | Sakuma et al. |
| 6,637,896 B2 | 10/2003 | Li et al. |
| 7,184,615 B2 | 2/2007 | Levola |
| 7,405,881 B2 | 7/2008 | Shimizu et al. |
| 7,559,895 B2 | 7/2009 | Stetten et al. |
| 7,724,443 B2 | 5/2010 | Amitai |
| 7,990,620 B2 | 8/2011 | Hung et al. |
| 8,487,980 B2 * | 7/2013 | Kroll et al. ............... 348/40 |
| 2003/0114200 A1 * | 6/2003 | Lee ............... 455/566 |
| 2003/0133284 A1 | 7/2003 | Chipchase et al. |
| 2006/0001596 A1 | 1/2006 | Cuffaro |
| 2006/0268421 A1 | 11/2006 | Shimizu et al. |
| 2009/0002829 A1 | 1/2009 | Shinohara |
| 2009/0201565 A1 * | 8/2009 | Bita et al. ............... 359/290 |
| 2009/0237564 A1 | 9/2009 | Kikinis et al. |
| 2009/0280916 A1 * | 11/2009 | Zambelli ............... 473/74 |

FOREIGN PATENT DOCUMENTS

| | | |
|---|---|---|
| EP | 1975675 A1 | 10/2008 |
| JP | 63187215 A | 8/1988 |
| JP | 02148179 U | 12/1990 |
| JP | 03092432 A | 4/1991 |
| JP | 10311963 A | 11/1998 |
| JP | 2000181375 A | 6/2000 |
| JP | 2003029343 A | 1/2003 |
| JP | 2004361559 A | 12/2004 |
| JP | 2006071770 A | 3/2006 |
| JP | 2006262980 A | 10/2006 |
| JP | 2007517473 A | 6/2007 |
| JP | 2009003281 A | 1/2009 |
| JP | 2011248345 A | 12/2011 |
| KR | 10-2003-0049083 A | 6/2003 |

OTHER PUBLICATIONS

Galeotti, et al., "In-Situ Visualization of Medical Images Using Holographic Optics", Retrieved at <<http://campar.in.tum.de/twiki/pub/AMIARCS08/ProceedingsOnline/95-103.pdf>>, Proceedings of the Augmented Medical Imaging including Augmented Reality in Computer-aided Surgery Workshop, MICCAI, Sep. 10, 2008, pp. 9.
"International Search Report", Mailed Date: May 15, 2013, Application No. PCT/US2013/020711, Filed Date: Jan. 9, 2013, pp. 10.
"Office Action Issued in European Patent Application No. 13738478.0", Mailed Date: Nov. 26, 2014, 8 Pages.
"Supplementary Search Report Issued in European Patent Application No. 13738478.0", Mailed Date: Oct. 14, 2014, 3 Pages.
"First Office Action & Search Report Issued in Chinese Patent Application No. 201380006017.1", Mailed Date: May 4, 2016, 15 Pages.
"Second Office Action and Search Report Issued in Chinese Patent Application No. 201380006017.1", Mailed Date: Nov. 28, 2016, 18 Pages.
"Office Action Issued in Japanese Patent Application No. 2014-553318", Mailed Date: Nov. 1, 2016, 8 Pages.

* cited by examiner

TRANSPARENT DISPLAY FOR MOBILE DEVICE

BACKGROUND

A mobile device is a small portable computing device typically comprising a display screen having a touch input, a keypad, and/or a miniature keyboard. Mobile devices include but are not limited to mobile phones and smartphones, email and/or Internet devices, portable GPS receivers, personal media players, handheld game players, personal digital assistants (PDAs), e-book readers, tablet devices, netbooks, notebooks, laptops, and other portable computers. Mobile phones, smartphones, e-book readers, and tablet-type portable devices have become prolific and are particularly popular among users who want to meld computing and communications technologies into everyday environments. In addition to computing and/or telephony, certain mobile devices (such as smartphones) also support a wide variety of services such as text messaging, email, Internet access, short-range wireless communications (via infrared, short-range radio, etc.), business and personal computing applications, gaming, photography, navigation, location-specific information and services, and data storage and retrieval, among other features and options.

However, typical mobile devices have several noticeable shortcomings. Many mobile devices may be difficult to use in bright sunlit environments because the display screens are relatively dim due in part to the fact that only a very small fraction of the light emitted by the display reaches the eye of the operator of the mobile device (i.e., the human operator's eye) coupled with the large amount of battery power used for the brightness of even relatively dim displays. Additionally, because mobile devices are used in public environments where third parties may eavesdrop and see sensitive information on the screen of the mobile device, these mobile devices present certain inherent privacy concerns. In addition, current mobile devices provide only limited "augmented reality" applications for integrating mobile device capabilities specific to their location and environment.

SUMMARY

Various implementations are directed to a projection-type display device that may be connectively coupled to a mobile device where the light generated by a small projection device is directed at a transparent holographic optical element (HOE) to provide a user display (i.e., a display to an operator of the mobile device, or a viewer). Depending on the implementation, the HOE may be transparent, partially transparent, or semi-transparent. In some implementations, the projector and the HOE may be configured to produce and magnify a virtual image that is perceived as being displayed at a large distance from the viewer of the image through the HOE (e.g., a human operator of the mobile device).

In some implementations, the HOE may comprise a volume grating effective at only the narrow wavelengths of the projection device to maximize transparency while also maximizing the light reflected from the display projector to the human operator's eye.

Some implementations may comprise "augmented reality" applications that produce a virtual image that, when projected at infinity, appears in the space beyond the mobile device and superimposed on the "real world" (as opposed to a real image in the plane of the display surface). For such implementations, the mobile device may be used with pointing and telestation applications including but not limited to use as a portable head-up display for an operator of the mobile device.

Certain implementations are directed to a mobile device comprising a mobile base comprising a processor and a memory for performing image computations, a projection device operatively coupled to the mobile base for projecting a display image in accordance with the image computations, and a transparent display surface comprising a holographic optical element and operatively coupled to the mobile base for directing the display image projected by the projection device to the operator of the mobile device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are more fully understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

Figure 1:
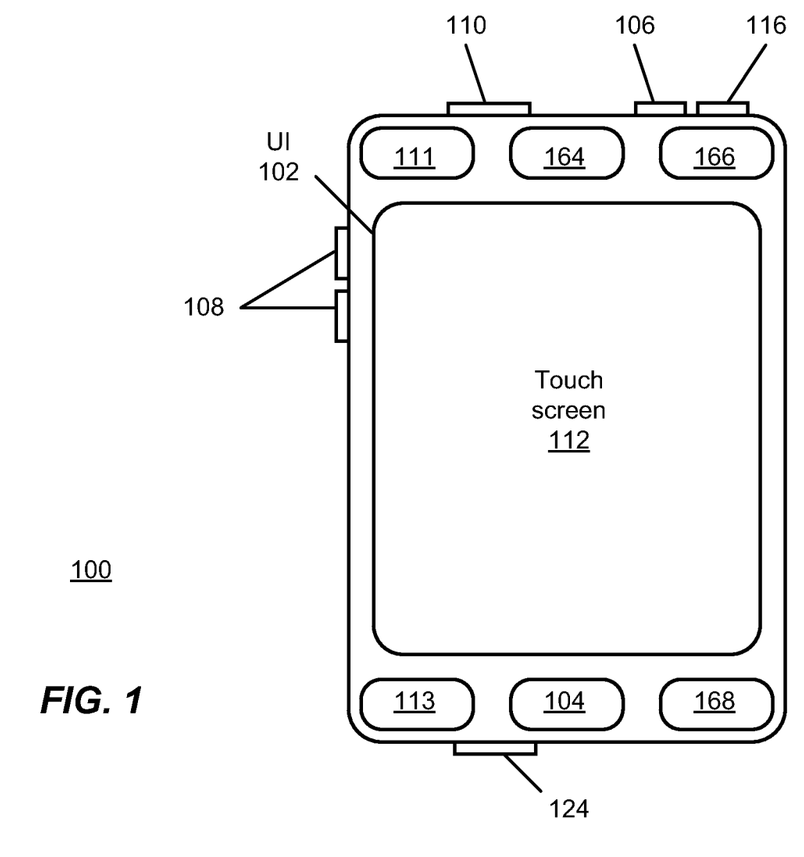
FIG. 1 is a top view illustration of an example mobile device with which the numerous implementations disclosed herein may be utilized.

FIG. 1 is a top view illustration of an example mobile device 100 with which the numerous implementations disclosed herein may be utilized. The mobile device 100—shown here as a smartphone, for example—may comprise a touch screen 112 that displays one or more graphics within the user interface (UI) 102. A user may select one or more of the graphics by making contact or touching the graphics, for example, with one or more fingers (not shown) or with another input device such as a stylus for example. The mobile device 100 may also include one or more physical buttons, such as a "home" or a menu button 104 which may be used to navigate to any application in a set of applications that may be executed on the mobile device 100. The menu button 104 may also or might instead be implemented as a soft key in a GUI in touch screen 112.

The mobile device 100 also may accept verbal input for activation or deactivation of some functions through a microphone 113. The mobile device 100 may also include a push button 106, a volume adjustment button(s) 108, a Subscriber Identity Module (SIM) card slot 110, a headset jack 116, a speaker 111, one or more optical sensors 164, one or more proximity sensors 166, one or more accelerometers 168, and/or a docking and charging external port 124. Further aspects of an example mobile device are described with respect to FIG. 5.

With regard to the mobile device 100, there are several different technologies available that could be used to build a transparent display device. For example, organic light emitting diode (LED) technology used in prototype display devices is mostly transparent, and even liquid crystal display (LCD) displays may be implemented without a backlight unit to provide a mostly transparent display device. However, such display devices are only able to produce images in the plane of the physical display surface, and thus are unable to improve light efficiency, address privacy issues, or support augmented reality applications.

In contrast, augmented reality applications have been utilized in very specialized contexts such as in aviation head-up displays (HUDs) where a semi-transparent mirror is used to overlay a display system in the pilot's direct view out of the cockpit window. Similar HUD-type devices have been utilized in some automobiles for displaying speed and other information. In both instances, an optical system is used to transform a real image from a physical display device into a virtual image that is reflected on the transparent surface (i.e., cockpit window or windshield) to appear at a large distance from the pilot or driver, respectively. These optical systems may also include a means for magnifying the image so that a relatively small display device can be used to generate an image that subtends a larger portion of the user's field of view.

A typical HUD generally comprises three primary components: a projection device, a combiner device, and a computation device. The projection device in a typical HUD comprises an optical collimator where a convex lens or concave mirror with a cathode ray tube (CRT), LED, or LCD at its focus. This arrangement produces an image where the light is parallel and thus the image so displayed is perceived by a user as having an infinite focal point. In other words, the projected image is "collimated" which makes the light rays parallel so that the human brain may interpret this parallel light to infer distance to an object such that collimated images on the HUD combiner device are perceived as existing at or near optical infinity.

The combiner device is typically an angled flat piece of glass located directly in front of the viewer that redirects the projected image from the projection device in such a way as to see the field of view and the projected infinity image at the same time. Combiner devices may have specific coatings that reflect the monochromatic light projected onto it from the projection device while allowing the other wavelengths of light to pass through. In some optical designs, the combiner device may also have a curved surface to refocus the image from the projection device. The computation device provides the interface between the HUD (i.e., the projection device) and the systems/data to be displayed, and operates by generating the imagery and symbology to be displayed by the projection device.

Various implementations disclosed herein pertain to a mobile device 100 comprising a display device (e.g., the display device 200 described further herein) that produces a virtual image at infinite focal point that is superimposed over a direct view through a transparent display surface (or, depending on the implementation, a partially transparent or semi-transparent display surface). From the operator's perspective (i.e., the viewer's perspective), the image does not appear on (or near) the display surface, but rather it appears virtually at a location far beyond the display of the mobile device.

For several such implementations, the display device directs light only towards a small region in space where the human operator's eyes are likely to be located. Thus, the displayed images are not observable from other nearby viewpoints, which enhances privacy and make the use of privacy filters unnecessary. In addition, the light of the display device is better confined to this same area where the operator's eyes are likely to be located, which results in a much higher fraction of the light reaching the operator's eyes compared to ordinary displays—thus, for the same amount of light generated, images generated by the display device will have greater intensity and appear much brighter to the operator, which will prevent battery drain.

Figure 2:
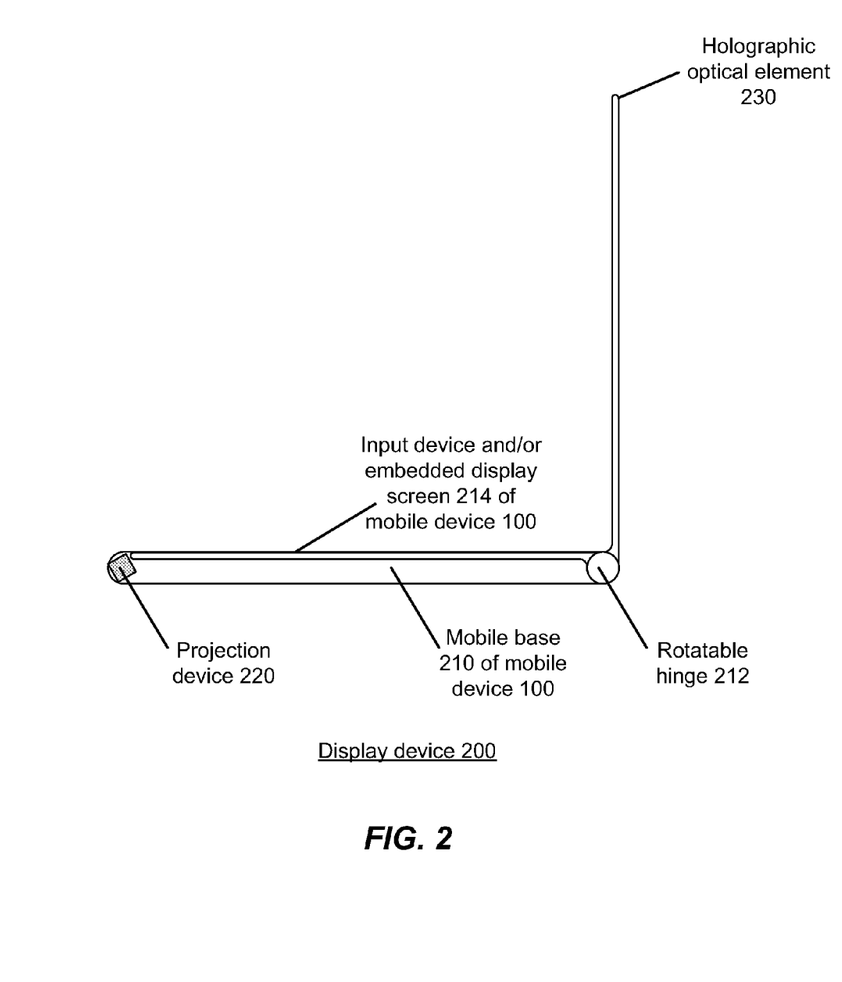
FIG. 2 is a side view of the example mobile device of FIG. 1 further comprising a display device representative of several implementations described herein.

FIG. 2 is a side view of a mobile device, such as the mobile device 100 of FIG. 1, comprising a display device 200 representative of several implementations described herein. As illustrated, the mobile device 100 comprises a mobile base 210. The mobile base 210 may comprise an input device and/or an embedded display screen 214 commonplace in many mobile devices. The display device 200 could be used as an auxiliary or extra display in addition to a conventional display that is activated by changing the transparent cover to the vertical viewing position. The mobile base 210 further comprises a processor and a memory (e.g., described with respect to FIG. 5) that may be used to produce the image for the auxiliary display device using the holographic optical element, in addition to any of several other processing tasks typical to mobile devices.

Operatively coupled to the mobile base 210 is a projection device 220 for generating the real image that will be viewed via the holographic optical element (HOE) 230. The HOE is a thin and transparent (or partially transparent or semi-transparent, depending on the implementation) surface that is attached to the mobile base 210 via a rotatable hinge 212. In the stowed or inactive position, the HOE 230 simply covers the primary display screen 214 of the mobile device 100. In the deployed or active position, as shown in FIG. 2, the HOE 230 transforms the real image for the projection device 220 into a virtual image that is visible to the user when viewed through the HOE 230. In this mode, the HOE 230 functions as a window through which a projected (and magnified) view of the image displayed by the projection device 220 becomes visible. In other words, the holographic optical element (HOE) 230 reflects a diverging modulated real image projected by the projection device 220 into a virtual image that is directed toward the operator of the mobile device (also referred to herein as the viewer).

In certain implementations, the light from the projection device 220 may be oriented away from the operator toward the HOE 230, and the HOE 230 may then transform and redirect this light back toward the operator of the mobile device 100 (or, more specifically, toward the human operator's eye(s)). Moreover, in several implementations, the HOE 230 may be operatively coupled to the mobile base 210 on a rotatable hinge 212 that enables the HOE 230 to be rotatably moved from a non-deployed "closed" and unusable position (not shown) parallel and in close proximity to the mobile base 210 to a deployed "open" and usable position (as shown in FIG. 2) that may be substantially perpendicular to the mobile base 210.

Figure 3:
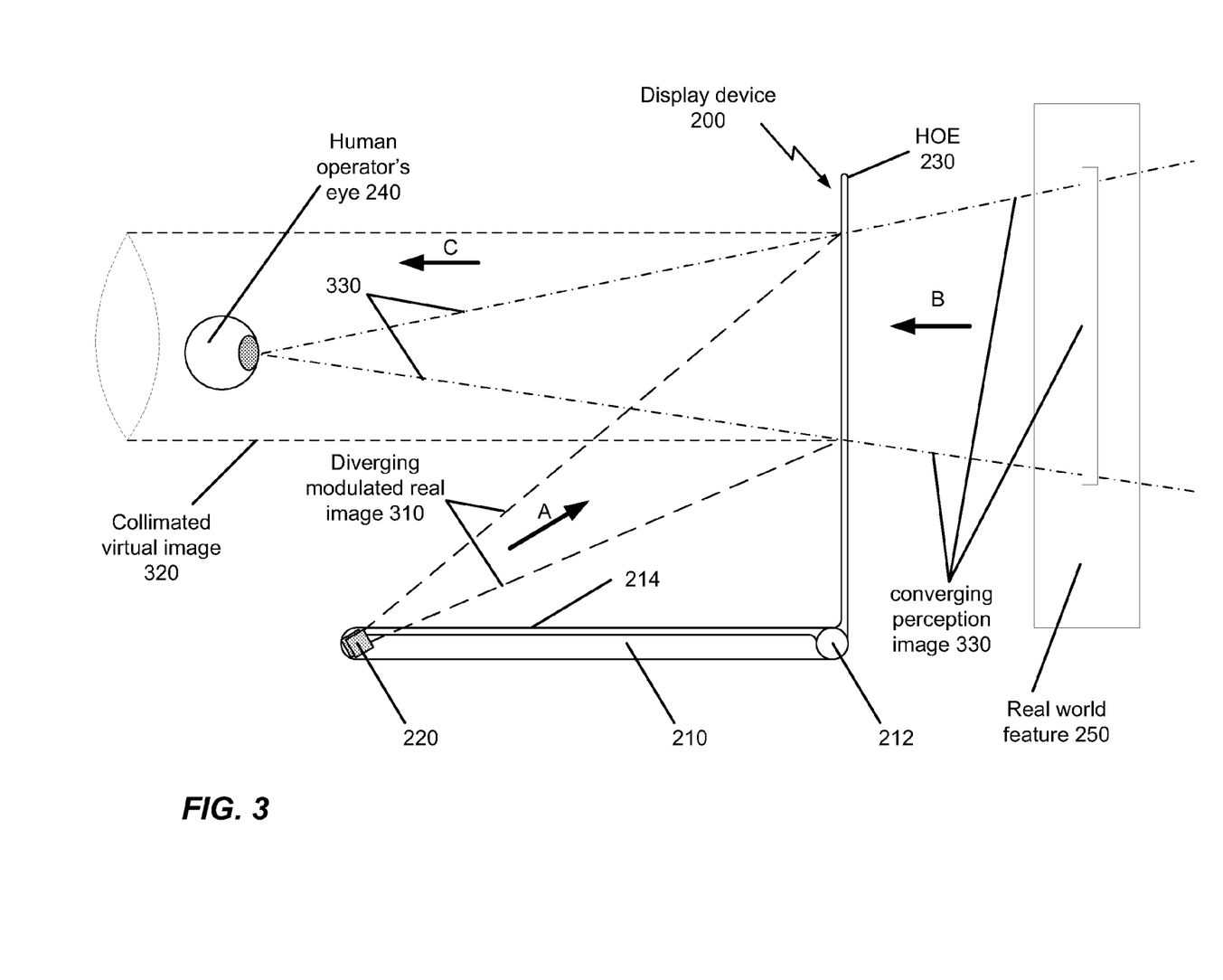
FIG. 3. is a side view of the example mobile device and display device of FIG. 2 illustrating operation of various components of the display device.
Figure 4:
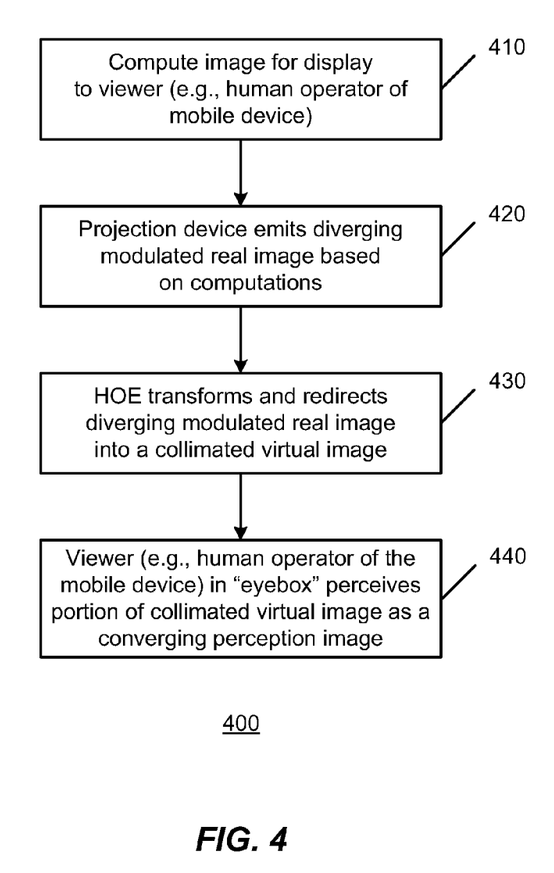
FIG. 4 is an operational flow of an implementation of a method for operation of an example display device.

FIG. 3. is a side view of the example mobile device and display device of FIG. 2 illustrating operation of the various components of the display device. FIG. 4 is an operational flow of an implementation of a method for operation of an example display device.

With regard to FIGS. 3 and 4, at 410, the mobile base 210 computes the auxiliary image, that is, performs whatever simple display computations are necessary to cause the projection device 220 to emit a specific diverging modulated real image towards the HOE 230 using any of several techniques known and appreciated by skilled artisans. This image may be simply a copy of the image shown on the primary display 214, or it may contain a different view, effectively providing the mobile device 100 with two independent display areas, one on the primary display 214 and one on the HOE 230 in the deployed position. The HOE 230 may also be used as an alternate display device where the primary display 214 is disabled while the auxiliary image is being displayed on the HOE 230.

At these computations may be used by the projection device 220 to emit a diverging modulated real image 310 (the diverging boundaries which are denoted by dashed lines in the direction shown by the arrow A) towards the HOE 230.

At 430, the HOE 230 transforms and reflects the diverging modulated real image 310 to form a collimated (i.e., having parallel light rays) virtual image 320 (the "infinite" boundaries of which, neither converging nor diverging, are denoted by parallel dashed lines in the direction shown by the arrow B) in the direction of the operator 240 who can see the image if his eyes are in the "eyebox" denoted by the boundaries of the volume of space through which the collimated virtual image 320 passes.

At 440, the operator 240, whose eyes are within the eyebox, perceives a small portion of the entire collimated virtual image 320 as a converging perception image 330 (the converging boundaries of which are denoted by dashed lines in the direction shown by the arrow C) being at an infinite focal distance beyond the HOE 230 and superimposed on whatever real world feature 250 visibly exists at that point of observation.

In several implementations, the projection device 220 may operate to generate a real image that is only a few millimeters in diameter. In several such implementations, the internal projection surface (also referred to as a "display") may comprise either a liquid crystal on silicon (LCOS) device used in LCOS projectors or digital micromirror devices (DMDs) used in digital light processing (DLP) projectors. Both LCOS and DMD devices use little power to operate and are about the size of an integrated circuit. As such, these devices may be integrated into the front edge of a mobile device 100 below and co-exist with an embedded display screen.

LCOS and DMD devices are light modulators that do not produce any light themselves; instead, these devices use an external light source that is also incorporated into the projection device 220. The light emitted from this light source is then collimated onto the LCOS or DMD surface where it is modulated with the image details. For typical projection applications (such as LCOS projection and DLP projection used in projection televisions), this modulated light might then be projected onto a diffuse reflective screen using an objective lens that also provides magnification. However, for the various projection device 220 implementations disclosed herein, no objective lens is used and, instead, the illumination optics comprising the light source are specifically designed to evenly cover the HOE with the modulated light of the image projection. Thus, the projection device 220 projects a diverging modulated real image onto the HOE 230 (i.e., a real image that is viewable from the position of the HOE). In addition, for several implementations, the light emitted by the projection device 220 might be limited to one wavelength (i.e., monochromatic) or a set of wavelengths such as, for example, corresponding to one each of a red, green, and blue wavelengths (i.e., trichromatic) for reasons described herein with regard to the HOE 230.

In some implementations, the HOE 230 is designed to function like a concave mirror (e.g., like a magnifying mirror for cosmetic use). Indeed, if the benefits of transparency are ignored, the HOE 230 could be replaced with a concave mirror that reflects (and magnifies) the diverging modulated real image from the projection device 220 so that it appears as the desired virtual image projected toward the operator "at infinity" (i.e., neither diverging or converging). However, in addition to lacking transparency, such a mirror would not feature a flat surface like the HOE 230 which makes a concave mirror somewhat impractical for use with a mobile device 100 having a flat mobile base 210. Thus, in some implementations, the HOE 230 may be designed to function like a concave mirror but also provide the additional features of transparency and a flat surface that is more compatible with the mobile base 210.

To achieve this, in an implementation, the HOE 230 is of the Bragg diffraction type where the thickness of the active HOE 230 material is much larger than the wavelength of the light. For some implementations, for example, the HOE 230 may comprise a dichromated gelatin that, when properly exposed and developed, possesses a 3D microstructure having very small transparent regions that differ in their index of refraction. The sizes of these microstructures may be on the order of one hundred (100) nanometers (nm)—near the wavelength of visible light—and the differing microstructures having differing indices of refraction may be produced within the HOE 230, using known techniques, to create the same light reflecting characteristics of a concave mirror but that also has the additional benefits of being both transparent and flat.

This concave mirror effect is due to the 3D microstructures in the HOE 230, where the Bragg diffraction that then occurs within the 3D microstructures of the HOE 230 acts as a filter to permit only light of the matching wavelength to be refracted. Thus, the HOE 230 may be designed so that the Bragg diffraction condition only applies to the specific wavelengths of light from the projection device 220 while all other wavelengths pass through the otherwise transparent HOE 230 largely unaffected.

For certain implementations, the HOE 230 may be relatively thick (e.g., 0.5 mm) to achieve high diffraction efficiency for the diverging modulated real image "light" from the projection device 220, and the HOE 230 may use a HOE material having very low scattering efficiency (i.e., where only a very small fraction of the light having "other wavelengths" that passes through the HOE 230 is affected by the HOE 230). A thick HOE 230 may be used to achieve high diffraction efficiency for the light from the projection device 220 because it uses many scattering 3D structures to constructively interfere with the light in order to effectively reflect the light from the display. Thus, the HOE 230 may be designed to be selective in both reflecting light from a very small wavelength range and a very small acceptance angle, both of which are properties that ensure that the HOE 230 is substantially transparent. There exist a number of photopolymers with such properties that are known to skilled artisans for such use as holographic storage elements.

The HOE 230 of various implementations may effectively function as a magnifying mirror that transforms and redirects the light from the projection device 220 towards the eyes of the viewer. Moreover, using techniques known to skilled artisans, constructing HOEs 230 with diffraction efficiencies of greater than 80% is possible, which in turn means that more light from the projection device 220 will be directed towards the eyes of the viewer by the HOE 230. In addition, the projection device 220 and the HOE 230 may operate together to ensure that most of the light will be focused on the region in space where the viewer's eyes are located, which greatly enhances the overall light efficiency and may be attained because the mobile device 100 does not use any kind of diffuser. This, in turn, means that the displayed image may be both bright (sunlight compatible) and/or power efficient. In addition, since the display can be observed only from a very small region of space, these various implementations can help assure the privacy of the display content.

In addition, for certain implementations, the light source for the projection device 220 may operate to concentrate emission into the acceptance wavelength bands of the HOE 230, and for some implementations this may comprise use of a monochrome projection device 220 that uses only one wavelength of light (for example, green light). In other implementations, the HOE 230 may be designed to operate concurrently for three narrow bands of light—one each for red, green, and blue light—and for such implementations the projection device 220 may use three such wavelengths of emitted light.

The light source employed by some implementations may comprise solid state lasers which are relatively efficient, monochromatic, and easy to focus. Although such lasers may be costly and have a "speckle effect" (which stems from their monochromaticity), the latter might be minimized by rapidly modulating the phase of the emission, although this may use additional components in the light path of the projection device 220. Other implementations might utilize LEDs as the light source which, in turn, may also comprise an additional interference filter to narrow the emission band of the LED at the expense of some light being lost.

As an added feature, the image seen by the operator subtends a certain solid angle rather than filling a fixed surface area. Consequently, the apparent size of the image can be much larger than the actual size of the mobile device. In effect, since the HOE 230 on the mobile device 100 acts like a window through which the display image is seen, by holding the mobile device 100 closer to the eye of the operator 240 a larger display area is practical. Notably, close proximity to the operator does not cause eye strain because the virtual image appears to be far away even when the HOE 230 is held very close to the eye of the operator 240.

Since the display device 200 produces a virtual image using the HOE 230 that appears superimposed on the real world as viewed through the transparent surface of the HOE, the device may be used in conjunction with a camera also operationally coupled to the mobile device that relays the same view to another, remote viewer through a wireless network connection (e.g., WiFi). For such utilization, the remote viewer may use a pointing device to point at objects within the field of view. This information may be relayed back to the mobile device which may use the display to superimpose the pointer onto the view of the real world. In essence, this allows interactive help from a remote viewer, for example to assist with problems where information is difficult to convey with only a voice connection.

In addition, if the display image is aligned with the view of the environment as seen through the display screen 214, the mobile device becomes a compelling augmented reality device that does not require the user to translate the information seen on the display screen 214 to the view of the outside world. This alignment may rely on the inertial sensors in the mobile device (MEMS accelerometers and gyroscopes), magnetic compass, and/or a GPS receiver. Image stabilization may also use a camera of the mobile device. It should be noted that in case a camera is used, its video stream may be used to determine attitude information; the video is not needed to generate a composite or overplayed image as would be used for a conventional display. For example, the processor comprising the mobile base 210 might use an embedded camera to determine at least one background feature visible through the display surface and perform the image computations based on the background feature detected.

In an implementation, a mobile device might determine display parameters based on a view of an environment seen by an operator of the mobile device looking through a transparent display surface comprising a holographic optical element and coupled to the mobile device. These determined display parameters may be used to perform image computations for projecting a display image from the mobile device's projection device onto the display surface in order to direct a display image to the operator that is aligned with the environment.

In an implementation, the HOE 230 is a passive component without any electronics but comprised of, for example, optical grade plastic. In an implementation, the HOE 230 may act as a protective cover for a conventional display screen of the mobile device. Moreover, the HOE 230 may be easily removable and replaceable because it does not use any electrical connections.

The transfer function encoded in the HOE 230 may depend on the wavelength of the light that is emitted by the projection device 220. For example, red and green light could produce two different virtual images that are laterally displaced but have the same magnification and other characteristics. This can be exploited to simplify the display 200 in the case where full RGB color reproduction is desired, i.e., where three (3) displays 200 are used—one for each primary color red, green, and blue—that are mounted side-by-side. This arrangement eliminates the need for any dichroic combiner optics which would otherwise be necessary to merge the three color images. Similarly, this simplifies the display device because each of the three (3) display devices could be optimized for one color only, thus eliminating the need for color filters and/or polychromatic light sources.

Figure 5:
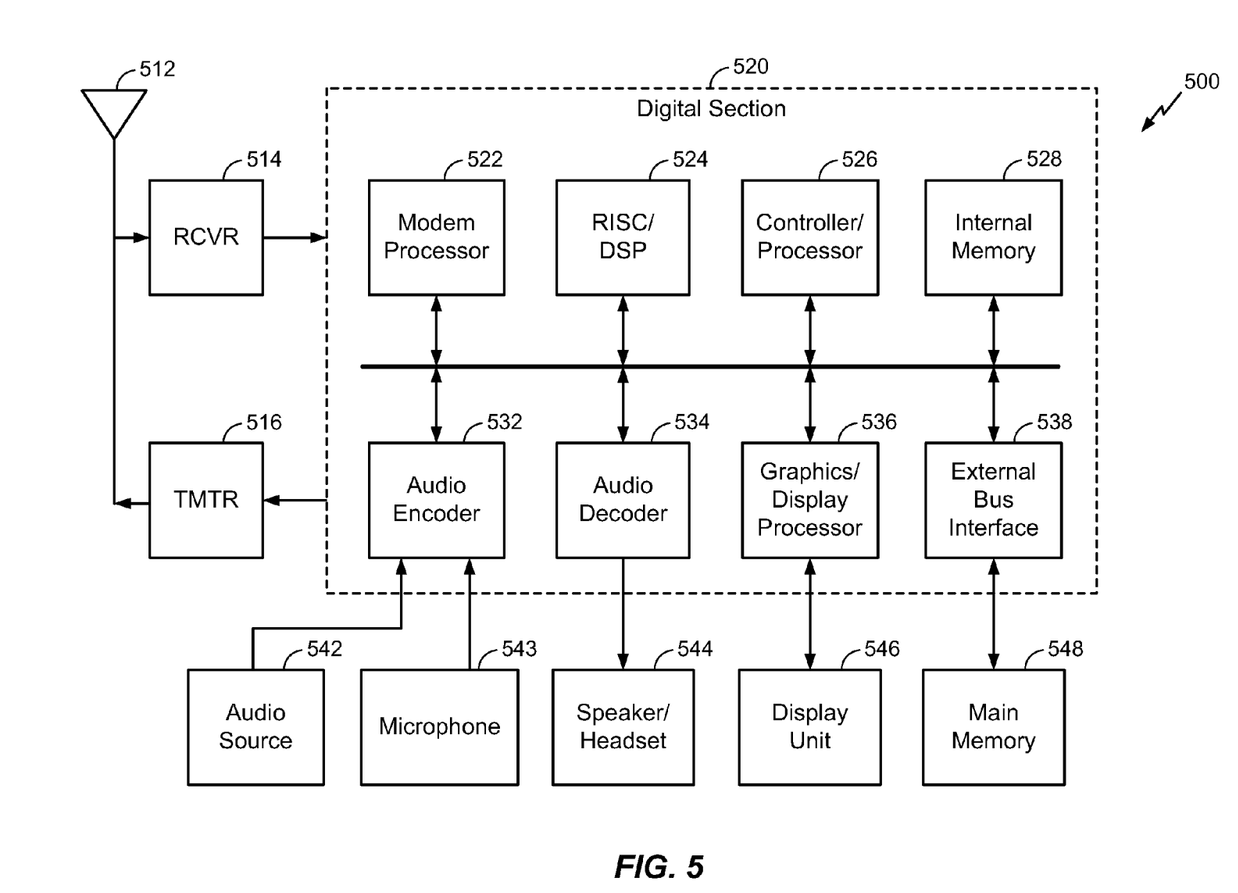
FIG. 5 shows a block diagram of a design of an example mobile device with which the numerous implementations disclosed herein may be utilized.

FIG. 5 shows a block diagram of the design of an example mobile device 500 with which the numerous implementations disclosed herein may be utilized. The design is only one example of a suitable computing environment and is not intended to suggest any limitation as to the scope of use or functionality. Numerous other general purpose or special purpose mobile device environments or configurations may be used. Mobile device 500 may be a cellular phone, a terminal, a handset, a PDA, a smartphone, a wireless modem, a cordless phone, etc. The mobile device may be used in conjunction with a wireless communication system such as a Code Division Multiple Access (CDMA) system, a Global System for Mobile Communications (GSM) system, etc.

Mobile device 500 is capable of providing bidirectional communication via a receive path and a transmit path. On the receive path, signals transmitted by base stations are received by an antenna 512 and provided to a receiver (RCVR) 514. Receiver 514 conditions and digitizes the received signal and provides samples to a digital section 520 for further processing. On the transmit path, a transmitter (TMTR) 516 receives data to be transmitted from digital section 520, processes and conditions the data, and generates a modulated signal, which is transmitted via antenna 512 to the base stations. Receiver 514 and transmitter 516 may be part of a transceiver that may support CDMA, GSM, etc.

Digital section 520 includes various processing, interface, and memory units such as, for example, a modem processor 522, a reduced instruction set computer/digital signal processor (RISC/DSP) 524, a controller/processor 526, an internal memory 528, a generalized audio encoder 532, a generalized audio decoder 534, a graphics/display processor 536, and an external bus interface (EBI) 538. Modem processor 522 may perform processing for data transmission and reception, e.g., encoding, modulation, demodulation, and decoding. RISC/DSP 524 may perform general and specialized processing for mobile device 500. Controller/processor 526 may direct the operation of various processing and interface units within digital section 520. Internal memory 528 may store data and/or instructions for various units within digital section 520.

Generalized audio encoder 532 may perform encoding for input signals from an audio source 542, a microphone 543, etc. Generalized audio decoder 534 may perform decoding for coded audio data and may provide output signals to a speaker/headset 544. Graphics/display processor 536 may perform processing for graphics, videos, images, and texts, which may be presented to a display unit 546. EBI 538 may facilitate transfer of data between digital section 520 and a main memory 548. Digital section 520 may be implemented with one or more processors, DSPs, microprocessors, RISCs, etc. Digital section 520 may also be fabricated on one or more application specific integrated circuits (ASICs) and/or some other type of integrated circuits (ICs).

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The various techniques described herein may be implemented in hardware, firmware, software, or a combination thereof. Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer readable medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A mobile device comprising:
   a mobile base comprising a processor and a memory to produce an image;
   a projection device operatively coupled to the mobile base for displaying the image; and
   a transparent display surface comprising a holographic optical element and operatively coupled to the mobile base for directing the displayed image projected by the projection device, wherein the projection device is oriented to project the display image in a direction away from an operator of the mobile device, wherein the transparent display surface is oriented to reflect the display image toward the operator of the mobile device, wherein the holographic element refracts a first set of wavelengths of light from the projection device while allowing a second set of wavelengths of light from a background feature to pass through the holographic optical element and the transparent display surface towards the operator, and wherein the background feature is located behind the transparent display surface and the projection device is located in front of the transparent display surface.

2. The mobile device of claim 1, wherein the display image is a collimated image that cannot be viewed outside of an eyebox corresponding to the collimated image.

3. The mobile device of claim 1, wherein the projection device collimates the display image to increase perceived light intensity.

4. The mobile device of claim 1, wherein the projection device utilizes light emitting diodes (LEDs) as the light source.

5. The mobile device of claim 1, wherein the projection device comprises a liquid crystal on silicon (LCOS) device or a digital micromirror device (DMD).

6. The mobile device of claim 1, wherein the projection device comprises an illumination optic that covers the holographic optical element with the modulated light for image projection without the need for an objective lens.

7. The mobile device of claim 1, wherein the projection device comprises at least three monochrome displays for displaying color images.

8. The mobile device of claim 1, wherein the holographic optical element comprises dichromated gelatin having a plurality of microstructures comprising a plurality of transparent regions that differ in their indices of refraction.

9. The mobile device of claim 8, wherein the plurality of microstructures act as an optical device similar to a concave mirror.

10. The mobile device of claim 1, wherein the holographic optical element uses Bragg diffraction to refract the first set of wavelengths of light from the projection device.

11. The mobile device of claim 1, wherein the display surface is rotatable from a closed position to an open position, wherein the display comprises no electronic components, and wherein the display device is removable and replaceable.

12. A method for displaying an image on a mobile device, the method comprising:
    performing image computations for projecting a display image of a first set of wavelengths of light from a projection device onto a transparent display surface comprising a holographic optical element such that the transparent display surface reflects the display image to an operator of the mobile device while allowing a second set of wavelengths of light from a background feature to pass through the transparent display surface towards the operator, wherein the background feature is located behind the transparent display surface and the projection device is located in front of the transparent display surface; and
    projecting the display image from the projection device onto the transparent display surface.

13. The method of claim 12, wherein the display image corresponds to the background feature, wherein the background feature is visible through the display surface by the operator.

14. The method of claim 12, wherein the display image is collimated such that the display image appears to have an infinite focal point.

15. The method of claim 12, wherein the projection device and the display surface comprise a second display to augment a first display.

16. The method of claim 12, wherein the display surface operates as a concave mirror and features a transparency and a flat surface.

17. A mobile device comprising:
a transparent display surface comprising a holographic optical element;
a projection device; and
a processor adapted to:
   determine display parameters based on a view of an environment seen by an operator of the mobile device looking through the transparent display surface; and
   perform image computations for projecting a display image of a first set of wavelengths of light from the projection device onto the transparent display surface to reflect the display image to the operator that is aligned with the environment while allowing a second set of wavelengths of light from a background feature to pass through the transparent display surface towards the operator, and wherein the background feature is located behind the transparent display surface and the projection device is located in front of the transparent display surface.

18. The mobile device of claim 17, wherein the processor is further adapted to:
determine the background feature; and
perform the image computations based on the background feature.

19. The mobile device of claim 18, wherein the mobile device further comprises a camera, and the processor adapted to determine the background feature further comprises the processor adapted to determine the background feature using the camera.

* * * * *